(12) United States Patent
Hough et al.

(10) Patent No.: US 9,990,309 B2
(45) Date of Patent: Jun. 5, 2018

(54) UNIVERSAL CONTROLLER TO SUPPORT REMOTE MONITORING OF SYSTEM AND/OR MACHINE HEALTH

(71) Applicant: Intel Corporation, Santa Clara, CA (US)

(72) Inventors: Paul F. Hough, Shannon (IE); Bradut Vrabete, Sixmilebridge (IE); Eric R. Auzas, Scottsdale, AZ (US)

(73) Assignee: Intel Corporation, Santa Clara, CA (US)

( * ) Notice: Subject to any disclaimer, the term of this patent is extended or adjusted under 35 U.S.C. 154(b) by 17 days.

(21) Appl. No.: 14/921,336

(22) Filed: Oct. 23, 2015

(65) Prior Publication Data

US 2017/0116137 A1    Apr. 27, 2017

(51) Int. Cl.
*G06F 13/10* (2006.01)
*G06F 9/445* (2018.01)
*G06F 3/00* (2006.01)
*G06F 9/44* (2018.01)

(52) U.S. Cl.
CPC ........ *G06F 13/102* (2013.01); *G06F 9/44505* (2013.01)

(58) Field of Classification Search
None
See application file for complete search history.

(56) References Cited

U.S. PATENT DOCUMENTS

| | | | |
|---|---|---|---|
| 2003/0050841 A1 | 3/2003 | Preston et al. | |
| 2006/0241966 A1* | 10/2006 | Walker | G06Q 20/20 700/232 |
| 2007/0119680 A1* | 5/2007 | Saltsov | G07D 11/0078 194/206 |
| 2009/0094081 A1 | 4/2009 | Wittern, III et al. | |
| 2011/0071668 A1* | 3/2011 | Lin | G07F 9/026 700/232 |
| 2014/0309770 A1 | 10/2014 | Signorelli et al. | |
| 2015/0074176 A1 | 3/2015 | Hansen | |

FOREIGN PATENT DOCUMENTS

WO    2006105197 A2    10/2006

OTHER PUBLICATIONS

International Search Report and Written Opinion for International Patent Application No. PCT/US2016/050425, dated Dec. 23, 2016, 12 pages.
Crane Payment Solutions, "ccTalk Serial Communication Protocol: Generic Specification", 2013, 216 pages, issue 4.7, Crane Payment Solutions.

* cited by examiner

*Primary Examiner* — Scott Sun
(74) *Attorney, Agent, or Firm* — Jordan IP Law, LLC

(57) ABSTRACT

Systems, apparatuses and methods may provide for determining, at runtime, one or more deviations of a peripheral device from a common interface based on one or more configuration files and translating one or more communications between the peripheral device and an application in accordance with the one or more deviations. In one example, a level of quality of a product dispensed by a system containing the peripheral device may be determined based on the communications. Moreover, a failure of the system may be predicted based on the communications.

30 Claims, 5 Drawing Sheets

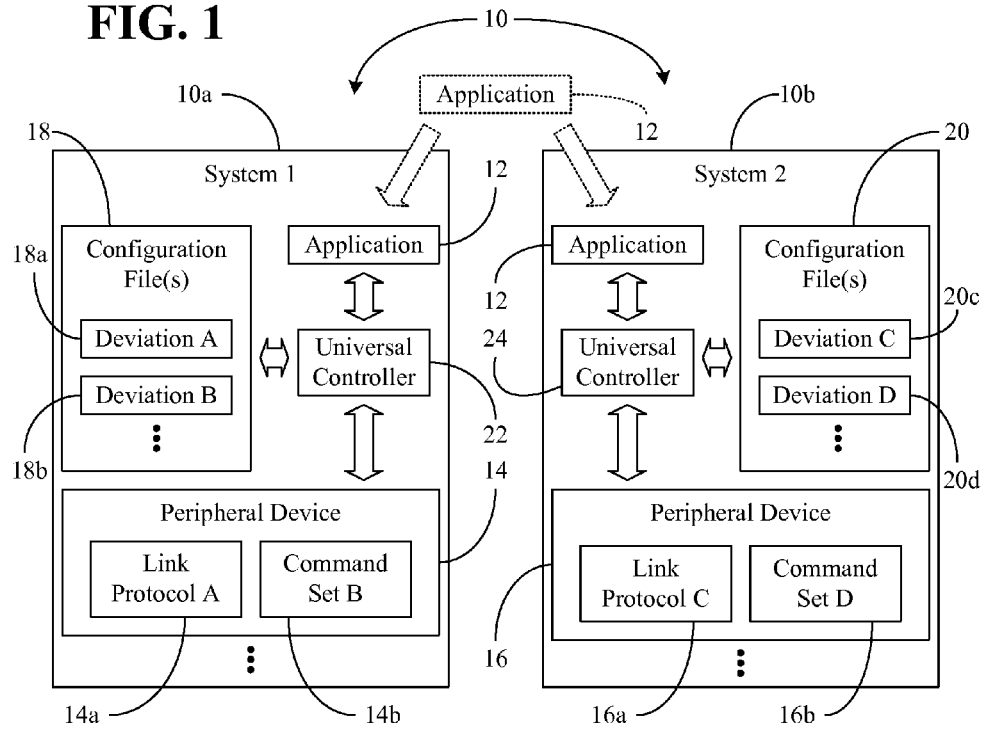

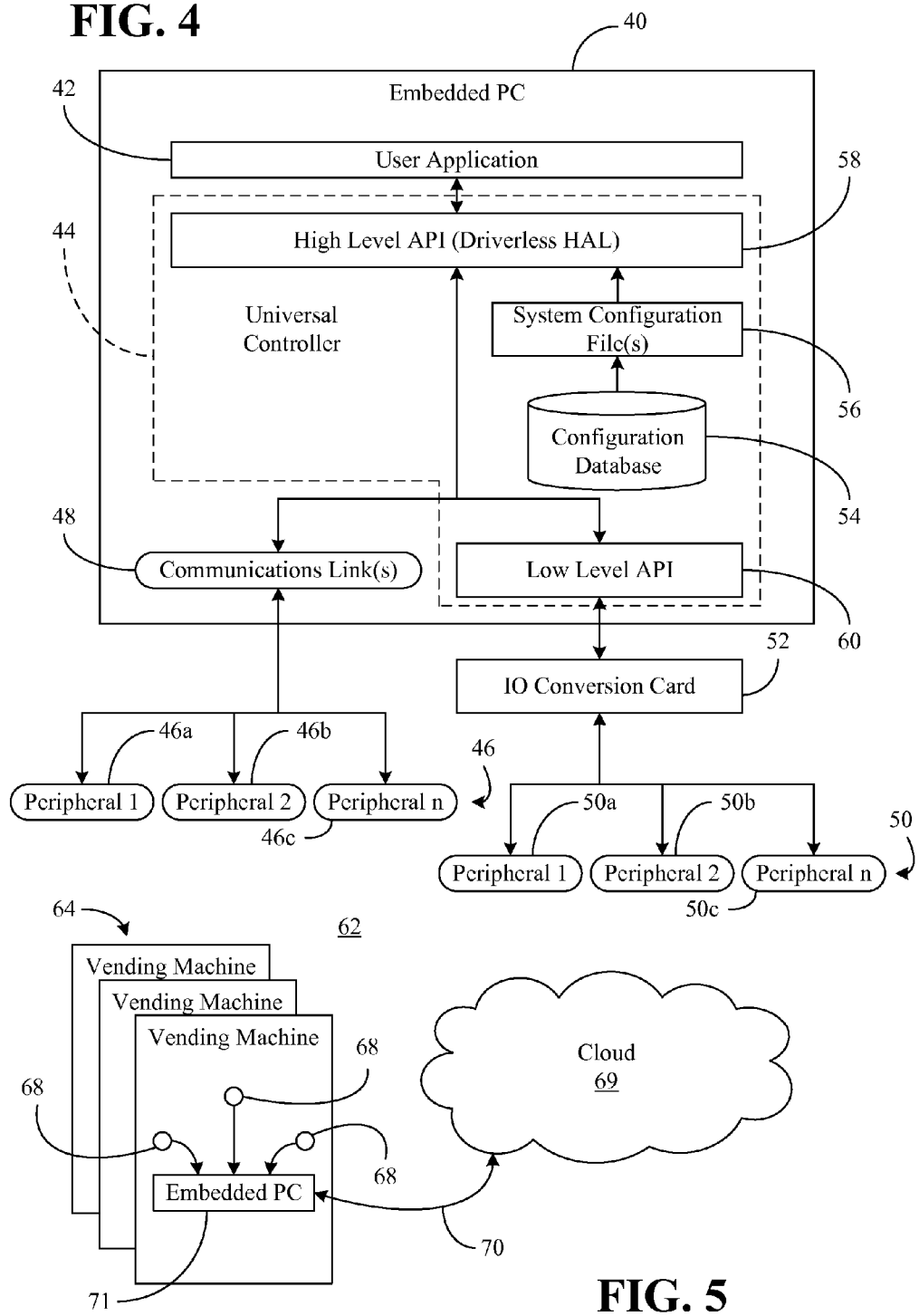

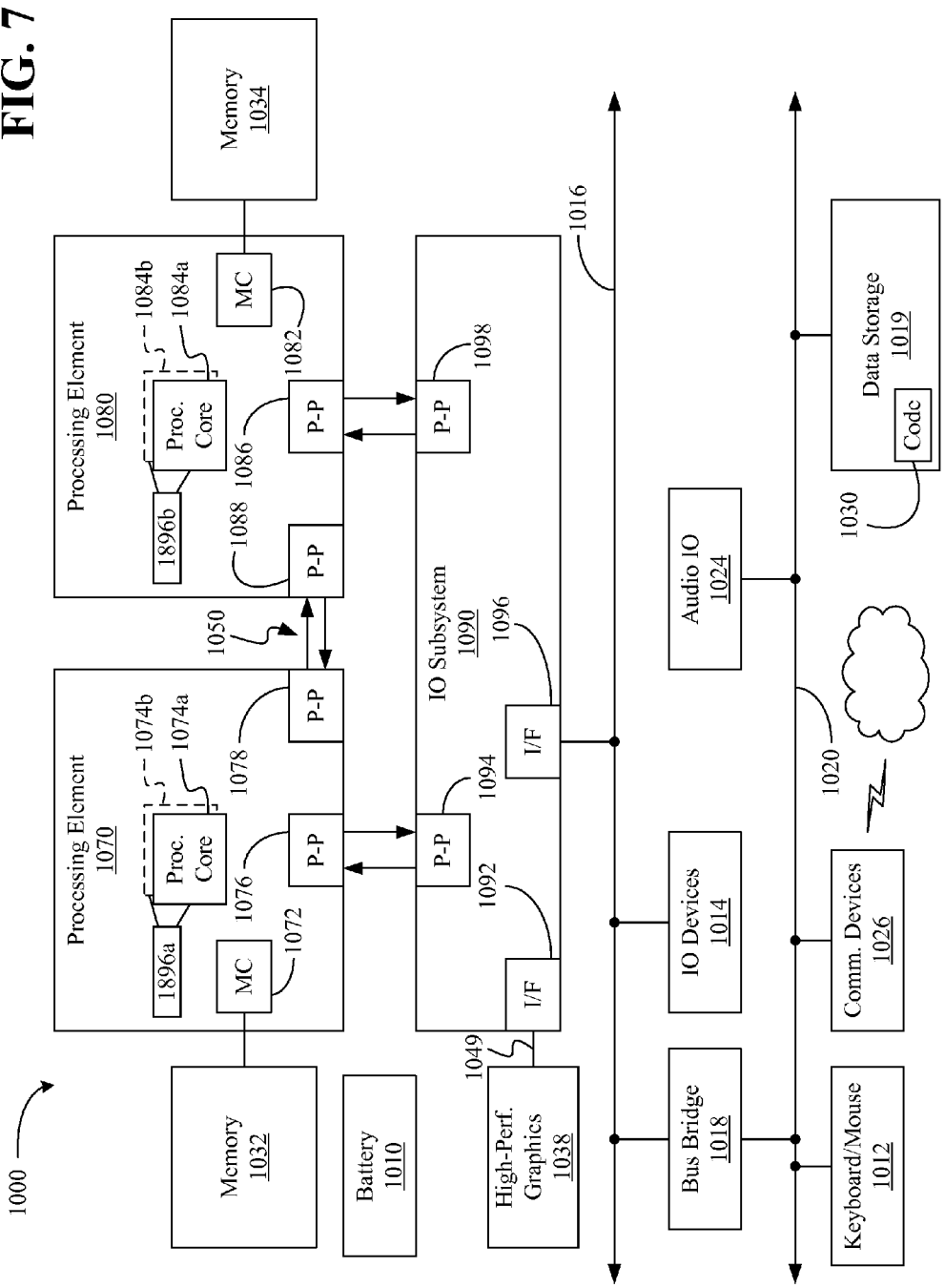

UNIVERSAL CONTROLLER TO SUPPORT REMOTE MONITORING OF SYSTEM AND/OR MACHINE HEALTH

TECHNICAL FIELD

Embodiments generally relate to system management. More particularly, embodiments relate to universal controllers that support remote monitoring of system and/or machine health.

BACKGROUND

Conventional vending machines may be equipped with sensors (e.g., coin detectors) and actuators (e.g., beverage dispensers) that have proprietary interfaces to the machine. Accordingly, installing a sensor or actuator on a vending machine may also involve installing a sensor- or actuator-specific driver and/or rewriting application code on the machine in order enable communications to take place with the installed sensor/actuator. Such an approach may result in increased fleet management costs. Additionally, remote monitoring of vending machines may be limited to detecting when a machine is completely non-operational. The quality of the dispensed product, however, may gradually deteriorate over time in a fashion that leads to a negative user experience prior to detection of the malfunction. Moreover, fleet management costs may be further increased by additional labor and/or parts associated with delayed notification of deteriorating vending machine health. Indeed, a considerable amount of revenue may be lost due to machine "down time" in such a case.

BRIEF DESCRIPTION OF THE DRAWINGS

The various advantages of the embodiments will become apparent to one skilled in the art by reading the following specification and appended claims, and by referencing the following drawings, in which:

FIG. 1 is a block diagram of an example of a plurality of systems according to an embodiment;

FIG. 2 is a flowchart of an example of a method of operating a universal controller apparatus according to an embodiment;

FIG. 4 is a block diagram of an example of an embedded computer apparatus according to an embodiment;

FIG. 5 is a block diagram of an example of a fleet management architecture according to an embodiment;

FIG. 7 is a block diagram of an example of a computing system according to an embodiment.

DESCRIPTION OF EMBODIMENTS

Figure 3:
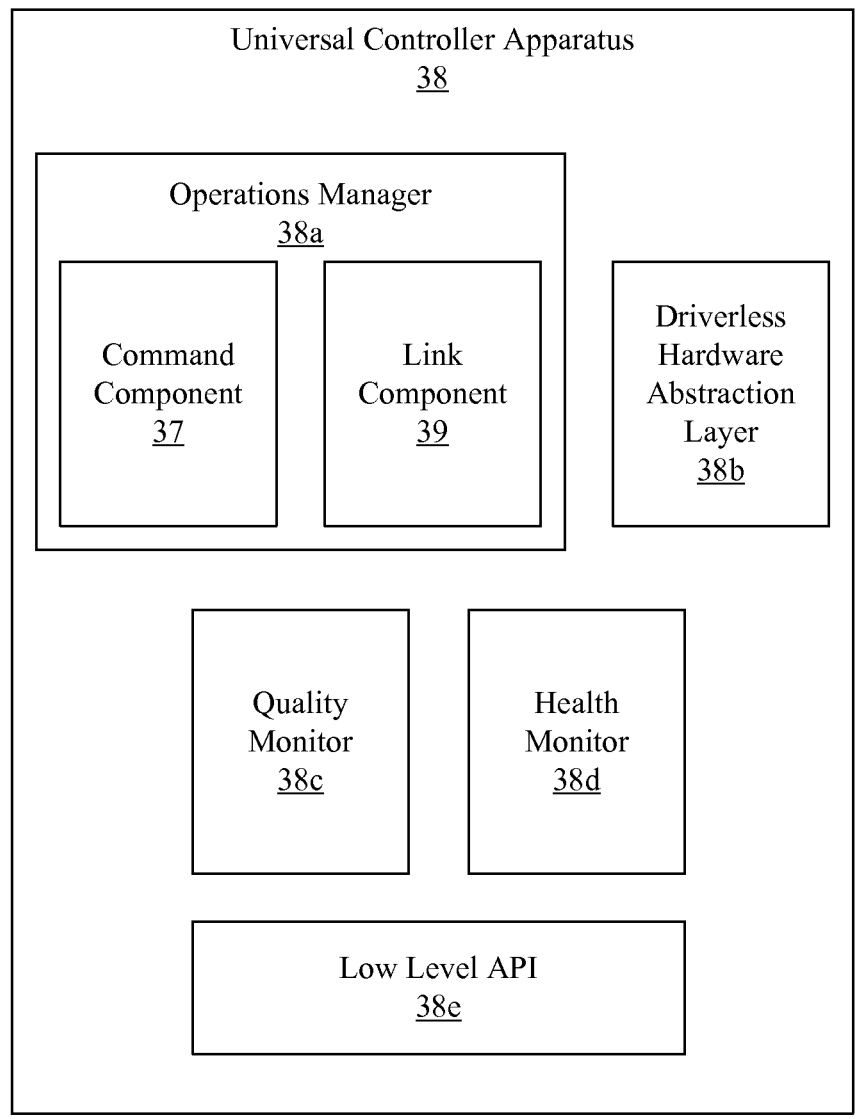
FIG. 3 is a block diagram of an example of a universal controller apparatus according to an embodiment.

Turning now to FIG. 1, a plurality of reconfigurable systems 10 (10a, 10b) are shown in which one or more peripheral devices such as a first peripheral device 14 (14a, 14b) are installed in a first system 10a and one or more peripheral devices such as a second peripheral device 16 (16a, 16b) are installed in a second system 10b. The systems 10 may include, for example, vending machines (e.g., coffee dispensers, snack dispensers), coolers, freezers, industrial appliances, home appliances, smart signage, smart shelves, etc., wherein the systems 10 may be remotely monitored for quality over time. The systems 10 may be considered reconfigurable in the sense that the peripheral devices 14, 16, which may include sensors, actuators, etc., may be installed and/or replaced one or more times throughout the respective operational life cycles of the systems 10 (e.g., at initial deployment, during repair, etc.). Moreover, while the peripheral devices 14, 16 may have similar functionality, the peripheral devices 14, 16 may have different manufacturers and operate according to different link protocols and/or command sets. The peripheral devices 14, 16 may also operate under different rules, translation curves, and/or data conversion parameters.

For example, the illustrated first peripheral device 14 communicates via a first link protocol 14a ("Link Protocol A") and the illustrated second peripheral device 16 communicates via a second link protocol 16a ("Link Protocol C"), wherein the link protocols 14a, 16a may be proprietary protocols that differ from one another. For example, in the case of a vending machine, the first peripheral device 14 may be a coin dispenser and the first link protocol 14a might be an MDB (Multi-Drop Bus) protocol (e.g., Multi-Drop Bus/International Communication Protocol, Version 4.2, February 2011, National Automatic Merchandising Association). The second peripheral device 16 may also be a coin dispenser, wherein the second link protocol 16a may be, for example, a ccTalk (Coin Controls Talk) protocol (e.g., ccTalk Serial Communication Protocol, Generic Specification, Parts 1-4, Issue 4.7, Crane Payment Solutions). It will be appreciated that MDB and ccTalk are exemplary protocols and that other protocols may be used in accord with the disclosed embodiments and principles.

In addition to the first and second link protocols 14a, 16a differing from one another, the first and second link protocols 14a, 16a may differ from one or more common interfaces (e.g., application programming interface/API standards and/or specifications) used by universal controllers 22, 24 to communicate with a common application 12 deployed on the reconfigurable systems 10. In this regard, the universal controllers 22, 24 may include an API (e.g., common interface, interface standard/specification) that is common between the reconfigurable systems 10. For example, the first and second link protocols 14a, 16a may differ from a common link protocol such as, for example, $I^2C$ (Inter-Integrated Circuit, e.g., I2C Specification UM10204, Rev. 03, Jun. 19, 2007, NXP Semiconductors), USB (Universal Serial Bus, e.g., USB Specification 3.1, Rev. 1.0, Jul. 26, 2013, USB Implementers Forum), RS-232, Zigbee, TCP/IP (Transmission Control Protocol/Internet Protocol), SPI (Serial Peripheral Interface), and/or GPIO (General Purpose Input/Output) of the universal controllers 22, 24. More particularly, the first link protocol 14a may differ from the link protocol used by the universal controller 22 to communicate with the common application 12 deployed on the first system 10a. Additionally, the second link protocol 16a may differ from the link protocol used by the universal controller 24 to communicate with the common application 12 deployed on the second system 10b.

Similarly, the first peripheral device 14 may operate according to a first command set 14b ("Command Set B") and the second peripheral device 16 may operate according to a second command set 16b ("Command Set D"), wherein the command sets 14b, 16b may also be proprietary command sets that differ from one another. Thus, in the case of a vending machine, the first command set 14b may include one operational code (opcode) to initiate a reset and/or write sequence on the first peripheral device 14, whereas the second command set 16b may include another opcode to initiate the reset and/or write sequence on the second peripheral device 16. Again, the command sets 14b, 16b, may differ from a common command set used by the universal controllers 22, 24 to communicate with the common application 12.

In the illustrated example, one or more configuration files 18 (18, 18b) may be loaded into the first system 10a, wherein the configuration files 18 may indicate a first deviation 18a ("Deviation A") of the first peripheral device 14 from the link protocol and a second deviation 18b ("Deviation B") of the first peripheral device 14 from the command set. Thus, if the first link protocol 14a is an MDB protocol and the link protocol used by the universal controller 22 to communicate with the application 12 is an $I^2C$ protocol, the first deviation 18a may specify the differences (e.g., protocol rules, conditions, pinouts, etc.) between the MDB protocol and the $I^2C$ protocol. Additionally, the second deviation 18b might specify, for example, the differences (e.g., opcode name, arguments, parameters and/or other attributes) between the opcode used by the application 12 to initiate a reset and/or write sequence and the opcode used by the first peripheral device 14 to initiate a reset and/or write sequence. Although two deviations 18a, 18b are shown, the configuration files 18 may document a theoretically unlimited number of deviations and/or combinations.

Similarly, one or more configuration files 20 (20a, 20b) may be loaded into the second system 10b, wherein the configuration files 20 indicate a third deviation 20c ("Deviation C") of the second peripheral device 16 from the link protocol and a fourth deviation ("Deviation D") of the second peripheral device 16 from the command set. Thus, if the second link protocol 16a is a ccTalk protocol and the link protocol used by the universal controller 24 to communicate with the application 12 is an $I^2C$ protocol, the third deviation 20c may specify the differences between the ccTalk and the $I^2C$ protocol. Additionally, the fourth deviation 20d might specify, for example, the differences between the opcode used by the application 12 to initiate a reset and/or write sequence and the opcode used by the second peripheral device 16 to initiate a reset and/or write sequence. The illustrated configuration files 18, 20, which are not drivers, may be formatted in an XML (Extensible Markup Language), text, or other suitable file type in order to convey the deviations 18a, 18b, 20a, 20b.

As will be discussed in greater detail, the universal controller 22 in the first system 10a may automatically determine, at runtime, the first deviation 18a and the second deviation 18b based on the one or more configuration files 18. Additionally, the universal controller 22 may translate one or more communications between the first peripheral device 14 and the application 12 in accordance with the first and second deviations 18a, 18b. Accordingly, the illustrated approach may be considered "driverless" to the extent that it enables the application 12 to communicate with the first peripheral device 14 without installing or otherwise provisioning the first system 10a with a driver that is specific to the first peripheral device 14. For example, if the first peripheral device 14 is a temperature sensor, the configuration files 18 may enable the application 12 to read temperature measurements without regard to the specific temperature sensor being used. Indeed, if the illustrated first peripheral device 14 were to be replaced with another peripheral device (e.g., another "newly installed" temperature sensor) that communicates via a protocol and/or command set that differs from the first link protocol 14a and/or the first command set 14b, respectively, the universal controller 22 may use one or more configuration files associated with the newly installed peripheral device to translate communications between the newly installed peripheral device and the application 12.

Similarly, the universal controller 24 in the second system 10b may automatically determine, at runtime, the third deviation 20c and the fourth deviation 20d based on the one or more configuration files 20. Additionally, the universal controller 24 may translate one or more communications between the second peripheral device 16 and the application 12 in accordance with the third and fourth deviations 20a, 20b. Thus, the illustrated approach also enables the application 12 to communicate with the second peripheral device 16 without installing or otherwise provisioning the second system 10b with a driver that is specific to the second peripheral device 16.

The illustrated solution therefore saves considerable costs and/or lost revenue associated with installing, repairing, and/or replacing the peripheral devices 14, 16. Indeed, if the reconfigurable systems 10 are part of a large fleet of vending machines, coolers, freezers, industrial appliances, home appliances, smart signs, smart shelves, etc., the cost and/or lost revenue savings may be scalable to yield a substantially more efficient fleet management system. Moreover, the common application 12 may be deployed to the plurality of reconfigurable systems 10 without rewriting the source code of the application 12 in order to enable communications with different peripheral devices 14, 16.

FIG. 2 shows a method 26 of operating a universal controller apparatus. The method 26 may generally be implemented in a universal controller apparatus such as the universal controller 22 (FIG. 1) and/or the universal controller 24 (FIG. 1), already discussed. More particularly, the method 26 may be implemented as a module or related component in a set of logic instructions stored in a non-transitory machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof. For example, computer program code to carry out operations shown in the method 26 may be written in any combination of one or more programming languages, including an object oriented programming language such as JAVA, SMALLTALK, C++ or the like and conventional procedural programming languages, such as the "C" programming language or similar programming languages.

Illustrated processing block 28 provides for determining, at runtime, a first deviation of a peripheral device from a common interface (e.g., interface standard/specification) such as, for example, a common link protocol based on one or more configuration files. Additionally, block 30 may determine, at runtime, a second deviation of the peripheral device from another common interface such as, for example, a common command set based on the one or more configuration files. Blocks 28 and/or 30 may be repeated for additional deviations. One or more communications between the peripheral device and an application may be translated at block 32. Block 32 may therefore enable the peripheral device to understand communications originating from the application and the application to understand communications originating from the peripheral device.

Block 34 may optionally determine, based on at least one of the one or more communications (e.g., temperature measurements, current measurements, etc.), a level of quality of a product dispensed by a system containing the peripheral device. For example, it may be determined that the taste of water in coffee is altered by a heavily scaled boiler in a coffee dispenser. In such a case, if the peripheral device is a sensor that indicates the level of scaling in the boiler of a coffee dispenser, block 34 may calculate the level of scaling in the boiler based on temperature, current, etc., to determine the level of quality (e.g., the impact on taste). Of particular note is that determining the level of quality may enable other actions such as, for example, making a branding adjustment, to be automatically taken by the vending machine in response to a detected drop in quality.

Additionally, illustrated block 36 optionally predicts, based on at least one of the one or more communications between the peripheral device and the application, a failure of the system containing the peripheral device. Block 36 may therefore reduce costs by enabling preventive maintenance to be performed rather than responding to complete system failures (e.g., eliminating unplanned emergency maintenance).

FIG. 3 shows a universal controller apparatus 38 (38a-38e). The apparatus 38, which may include logic instructions, configurable logic and/or fixed-functionality hardware logic, may implement one or more aspects of the method 26 (FIG. 2), already discussed. Accordingly, the apparatus 38 may be readily substituted for the universal controller 22 (FIG. 1) and/or the universal controller 24 (FIG. 1), already discussed. In the illustrated example, an operations manager 38a determines, at runtime, one or more deviations of a peripheral device from an interface (e.g., common API, interface standard/specification) based on one or more configuration files. More particularly, a link component 39 may determine, at runtime, a first deviation of the peripheral device from a link protocol based on the one or more configuration files and a command component 37 may determine, at runtime, a second deviation of the peripheral device from a command set based on the one or more configuration files. The apparatus 38 may also include a driverless hardware abstraction layer (HAL) 38b to translate one or more communications between the peripheral device and an application in accordance with the first deviation and the second deviation. The peripheral device, which may be newly installed, may be a sensor (e.g., temperature sensor, humidity sensor, pressure sensor) and/or actuator (e.g., the one or more communications may be translated between the application and a newly installed peripheral device, a sensor and/or an actuator).

In one example, a quality monitor 38c determines, based on at least one of the one or more communications, a level of quality of a product dispensed by a system containing the peripheral device. As already noted, the product may be dispensed by a vending machine. Additionally, a health monitor 38d may predict, based on at least one of the one or more communications, a failure of the system containing the peripheral device. The predictions may take into consideration, for example, machine learning techniques, data driven models, and so forth. The illustrated apparatus 38 also includes a low level application programming interface (API) 38e to communicate with the peripheral device via an input/output (IO) conversion card (e.g., using a proprietary interface).

Turning now to FIG. 4, an embedded computer apparatus 40 (e.g., personal computer/PC) is shown, wherein the embedded computer apparatus 40 may be part of a system such as, for example, a vending machine (e.g., coffee dispenser, snack dispenser), cooler, freezer, industrial appliance, home appliance, smart signage, smart shelf, and so forth. In the illustrated example, the apparatus 40 executes a user application 42 and includes a universal controller 44 that functions similarly to the universal controller apparatus 38 (FIG. 3), already discussed. In the illustrated example, a first set of peripheral devices 46 (46a-46c) are coupled to a communications link 48 of the apparatus 40 and a second set of peripheral devices 50 (50a-50c) are coupled to the apparatus 40 via an optional IO conversion card 52. The first set of peripheral devices 46 may communicate via a PC standard protocol such as, for example, I²C, USB, RS-232, Zigbee, TCP/IP, SPI, GIP, etc., whereas the second set of peripheral devices 50 may communicate via a non-PC standard such as, for example, MDB, CAN (Controller Area Network), GPIO, and so forth.

In the illustrated example, a database subsystem such as a configuration database 54 generates one or more system configuration files 56 that are used by a high level API 58 (e.g., Driverless HAL) to translate communications between the peripheral devices 46, 50 and the user application 42. The universal controller 44 may also include a low level API 60 that communicates with the second set of peripheral devices 50 via the IO conversion card 52. As already noted, the universal controller 44 may be configured to detect protocol and command set deviations from one or more standard protocols and command sets used by the user application 42, so that the use of device-specific drivers and/or rewriting of the user application 42 source code may be avoided.

FIG. 5 shows a fleet management architecture 62 in which a plurality of vending machines 64 support remote monitoring of the health of the vending machines 64 by a cloud computing infrastructure 69. Each vending machine 64 may include peripheral devices 68 (e.g., sensors, actuators) that report data 70 back to the cloud computing infrastructure 69 via an embedded PC 71 when actionable conditions are detected (e.g., resulting in condition based fleet management). The data 70 may include information, alerts, etc., regarding the quality of products (e.g., beverages, snacks, etc.) dispensed by the vending machines 64, as well as predictions of future failures of the vending machines 64. Conducting quality analysis and/or failure predictions locally at the vending machines 64 may reduce WWAN (wireless wide area network) bandwidth usage and further enhance efficiency.

Figure 6:
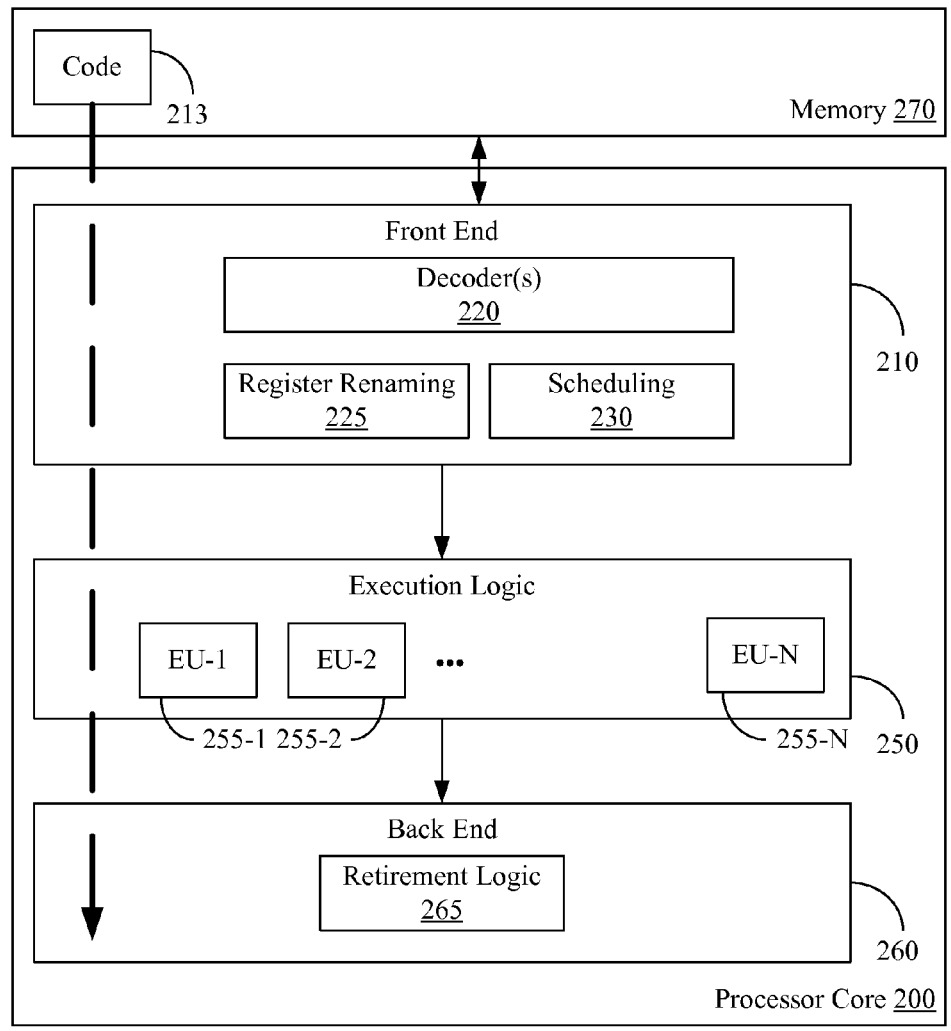
FIG. 6 is a block diagram of an example of a processor according to an embodiment.

FIG. 6 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 6, a processing element may alternatively include more than one of the processor core 200 illustrated in FIG. 6. The processor core 200 may be a single-threaded core or, for at least one embodiment, the processor core 200 may be multithreaded in that it may include more than one hardware thread context (or "logical processor") per core.

FIG. 6 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement aspects of the method 26 (FIG. 2), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 6, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Referring now to FIG. 7, shown is a block diagram of a computing system 1000 embodiment in accordance with an embodiment. Shown in FIG. 7 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 7 may be implemented as a multi-drop bus rather than point-to-point interconnect.

As shown in FIG. 7, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 6.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 7, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 7, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 7, various I/O devices 1014 (e.g., speakers, cameras, sensors, actuators) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement the method 26 (FIG. 2), already discussed, and may be similar to the code 213 (FIG. 6), already discussed. Further, an audio I/O 1024 may be coupled to second bus 1020 and a battery 1010 may supply power the computing system 1000.

Note that other embodiments are contemplated. For example, instead of the point-to-point architecture of FIG. 7, a system may implement a multi-drop bus or another such communication topology. Also, the elements of FIG. 7 may alternatively be partitioned using more or fewer integrated chips than shown in FIG. 7.

Additional Notes and Examples

Example 1 may include a reconfigurable system comprising a peripheral device, a database subsystem to generate one or more configuration files that indicate one or more deviations of the peripheral device from a common interface, and an embedded computer apparatus to execute an application, the embedded computer apparatus including, an operations manager to determine, at runtime, the one or more deviations based on the one or more configuration files, and a driverless hardware abstraction layer to translate one or more communications between the peripheral device and the application in accordance with the first deviation and the second deviation.

Example 2 may include the system of Example 1, wherein the operations manager includes one or more of a link component to determine, at runtime, a first deviation of the peripheral device from a common link protocol based on at least one of the one or more configuration files, or a command component to determine, at runtime, a second deviation of the peripheral device from a common command set based on at least one of the one or more configuration files.

Example 3 may include the system of Example 1, wherein the embedded computer apparatus further includes a quality monitor to determine, based on at least one of the one or more communications, a level of quality of a product dispensed by the system.

Example 4 may include the system of Example 1, wherein the embedded computer apparatus further includes a health monitor to predict, based on at least one of the one or more communications, a failure of the system.

Example 5 may include the system of Example 1, wherein the peripheral device is a newly installed peripheral device.

Example 6 may include the system of any one of Examples 1 to 5, wherein the peripheral device includes one or more of a sensor or an actuator.

Example 7 may include a universal controller apparatus comprising an operations manager to determine, at runtime, one or more deviations of a peripheral device from a common interface based on one or more configuration files, and a driverless hardware abstraction layer to translate one or more communications between the peripheral device and an application in accordance with the one or more deviations.

Example 8 may include the apparatus of Example 7, wherein the operations manager includes one or more of a link component to determine, at runtime, a first deviation of the peripheral device from a common link protocol based on at least one of the one or more configuration files, or a command component to determine, at runtime, a second deviation of the peripheral device from a common command set based on at least one of the one or more configuration files.

Example 9 may include the apparatus of Example 7, further including a quality monitor to determine, based on at least one of the one or more communications, a level of quality of a product dispensed by a system containing the peripheral device.

Example 10 may include the apparatus of Example 7, further including a health monitor to predict, based on at least one of the one or more communications, a failure of the system containing the peripheral device.

Example 11 may include the apparatus of Example 7, wherein the one or more communications are to be translated between a newly installed peripheral device and the application.

Example 12 may include the apparatus of any one of Examples 7 to 11, wherein the one or more communications are translated between one or more of a sensor or an actuator and the application.

Example 13 may include a method of operating a universal controller apparatus, comprising determining, at runtime, one or more deviations of a peripheral device from a common interface based on one or more configuration files, and translating one or more communications between the peripheral device and an application in accordance with the one or more deviations.

Example 14 may include the method of Example 13, wherein determining the one or more deviations includes one or more of determining, at runtime, a first deviation of the peripheral device from a common link protocol based on at least one of the one or more configuration files, or determining, at runtime, a second deviation of the peripheral device from a common command set based on at least one of the one or more configuration files.

Example 15 may include the method of Example 13, further including determining, based on at least one of the one or more communications, a level of quality of a product dispensed by a system containing the peripheral device.

Example 16 may include the method of Example 13, further including predicting, based on at least one of the one or more communications, a failure of the system containing the peripheral device.

Example 17 may include the method of Example 13, wherein the one or more communications are translated between a newly installed peripheral device and the application.

Example 18 may include the method of any one of Examples 13 to 17, wherein the one or more communications are translated between one or more of a sensor or an actuator and the application.

Example 19 may include at least one non-transitory computer readable storage medium comprising a set of instructions, which when executed by a computing device, cause the computing device to determine, at runtime, one or more deviations of a peripheral device from a common interface based on one or more configuration files, and translate one or more communications between the peripheral device and an application in accordance with the one or more deviations.

Example 20 may include the at least one non-transitory computer readable storage medium of Example 19, wherein the instructions, when executed, cause a computing device to one or more of determine, at runtime, a first deviation of the peripheral device from a common link protocol based on at least one of the one or more configuration files, or determine, at runtime, a second deviation of the peripheral device from a common command set based on at least one of the one or more configuration files.

Example 21 may include the at least one non-transitory computer readable storage medium of Example 19, wherein the instructions, when executed, cause a computing device to determine, based on at least one of the one or more communications, a level of quality of a product dispensed by a system containing the peripheral device.

Example 22 may include the at least one non-transitory computer readable storage medium of Example 19, wherein the instructions, when executed, cause a computing device to predict, based on at least one of the one or more communications, a failure of the system containing the peripheral device.

Example 23 may include the at least one non-transitory computer readable storage medium of Example 19, wherein the one or more communications are to be translated between a newly installed peripheral device and the application.

Example 24 may include the at least one non-transitory computer readable storage medium of any one of Examples 19 to 23, wherein the one or more communications are to be translated between one or more of a sensor or an actuator and the application.

Example 25 may include a universal controller apparatus comprising means for determining, at runtime, one or more deviations of a peripheral device from a common interface based on one or more configuration files, and means for translating one or more communications between the peripheral device and an application in accordance with the one or more deviations.

Example 26 may include the apparatus of Example 25, wherein the means for determining the one or more deviations includes one or more of means for determining, at runtime, a first deviation of the peripheral device from a common link protocol based on at least one of the one or more configuration files, or means for determining, at runtime, a second deviation of the peripheral device from a common command set based on at least one of the one or more configuration files.

Example 27 may include the apparatus of Example 25, further including means for determining, based on at least one of the one or more communications, a level of quality of a product dispensed by a system containing the peripheral device.

Example 28 may include the apparatus of Example 25, further including means for predicting, based on at least one of the one or more communications, a failure of the system containing the peripheral device.

Example 29 may include the apparatus of Example 25, wherein the one or more communications are to be translated between a newly installed peripheral device and the application.

Example 30 may include the apparatus of any one of Examples 25 to 29, wherein the one or more communications are to be translated between one or more of a sensor or an actuator and the application.

Thus, techniques described herein may use a driverless HAL to control newly installed devices and sensors without writing/installing a new driver or changing the application or API. Communication may be achieved by simply describing the new device in a configuration file. Additionally, the user application may be independent of the peripheral device protocol. All protocol configuration and complexities may be handled by the driverless HAL. For example, the user application may use the same high level API to communicate with the peripheral device regardless of the protocol and/or command set used by the peripheral device. Moreover, such an approach may significantly enhance flexibility.

Additionally, condition based fleet management techniques may accelerate installation/repair and reduce costs associated with the management of vending machine fleets. Data analysis may be distributed between machine (e.g., at the "edge") and server, so that only actionable data is transferred (e.g., reducing bandwidth usage). Condition based fleet management may also enable vending machines to deliver products (e.g., coffee) of consistent quality. The techniques may also be used to enhance the efficiency of Internet of Things (IOT) solutions.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A system comprising:
   a peripheral device;
   a database subsystem to generate one or more configuration files that indicate one or more deviations of the peripheral device from a common interface; and
   an embedded computer apparatus to execute an application, the embedded computer apparatus including,
      an operations manager to determine, at runtime, the one or more deviations based on the one or more configuration files, and
      a driverless hardware abstraction layer to translate one or more communications between the peripheral device and the application in accordance with a first deviation and a second deviation, wherein a product branding adjustment is made in response to the translation of the communications when a drop in a level of quality of a product indicates an impact on taste.

2. The system of claim 1, wherein the operations manager includes one or more of:
   a link component to determine, at runtime, the first deviation of the peripheral device from a common link protocol based on at least one of the one or more configuration files; or
   a command component to determine, at runtime, the second deviation of the peripheral device from a common command set based on at least one of the one or more configuration files.

3. The system of claim 1, wherein the embedded computer apparatus further includes a quality monitor to determine, based on at least one of the one or more communications, the level of quality of the product dispensed by the system, wherein the product branding adjustment is made when the drop in the level of quality of the product is determined.

4. The system of claim 1, wherein the embedded computer apparatus further includes a health monitor to predict, based on at least one of the one or more communications, a failure of the system.

5. The system of claim 1, wherein the peripheral device is a newly installed peripheral device.

6. The system of claim 1, wherein the peripheral device includes one or more of a sensor or an actuator.

7. An apparatus comprising:
   an operations manager to determine, at runtime, one or more deviations of a peripheral device from a common interface based on one or more configuration files; and
   a driverless hardware abstraction layer to translate one or more communications between the peripheral device and an application in accordance with the one or more deviations, wherein a product branding adjustment is made in response to the translation of the communications when a drop in a level of quality of a product indicates an impact on taste.

8. The apparatus of claim 7, wherein the operations manager includes one or more of:
   a link component to determine, at runtime, a first deviation of the peripheral device from a common link protocol based on at least one of the one or more configuration files; or
   a command component to determine, at runtime, a second deviation of the peripheral device from a common command set based on at least one of the one or more configuration files.

9. The apparatus of claim 7, further including a quality monitor to determine, based on at least one of the one or more communications, the level of quality of the product dispensed by a system containing the peripheral device, wherein the product branding adjustment is to be made in response to the translation of the communications when the drop in the level of quality of the product is determined.

10. The apparatus of claim 7, further including a health monitor to predict, based on at least one of the one or more communications, a failure of the system containing the peripheral device.

11. The apparatus of claim 7, wherein the one or more communications are to be translated, by the driverless hardware abstraction layer, between a newly installed peripheral device and the application.

12. The apparatus of claim 7, wherein the one or more communications are translated, by the driverless hardware abstraction layer, between one or more of a sensor or an actuator and the application.

13. A method comprising:
   determining, at runtime by an operations manager implemented at least partly in one or more of configurable logic or fixed-functionality logic hardware using circuit technology, one or more deviations of a peripheral device from a common interface based on one or more configuration files; and
   translating, by a driverless hardware abstraction layer implemented at least partly in one or more of configurable logic or fixed-functionality logic hardware using circuit technology, one or more communications between the peripheral device and an application in accordance with the one or more deviations, wherein a product branding adjustment is made in response to the translation of the communications when a drop in a level of quality of a product indicates an impact on taste.

14. The method of claim 13, wherein determining the one or more deviations includes one or more of:
   determining, at runtime by a link component implemented at least partly in one or more of configurable logic or fixed-functionality logic hardware using circuit technology, a first deviation of the peripheral device from a common link protocol based on at least one of the one or more configuration files; or
   determining, at runtime by a command component implemented at least partly in one or more of configurable logic or fixed-functionality logic hardware using circuit technology, a second deviation of the peripheral device from a common command set based on at least one of the one or more configuration files.

15. The method of claim 13, further including determining, by a quality monitor implemented at least partly in one or more of configurable logic or fixed-functionality logic hardware using circuit technology, based on at least one of the one or more communications, the level of quality of the product dispensed by a system containing the peripheral device, wherein the product branding adjustment is made in response to the translation of the communications when the drop in the level of quality of the product is determined.

16. The method of claim 13, further including predicting, by a health monitor implemented at least partly in one or more of configurable logic or fixed-functionality logic hardware using circuit technology, based on at least one of the one or more communications, a failure of the system containing the peripheral device.

17. The method of claim 13, wherein the one or more communications are translated, by the driverless hardware abstraction layer, between a newly installed peripheral device and the application.

18. The method of claim 13, wherein the one or more communications are translated, by the driverless hardware abstraction layer, between one or more of a sensor or an actuator and the application.

19. At least one non-transitory computer readable storage medium comprising a set of instructions, which when executed by a computing device, cause the computing device to:
   determine, at runtime by an operations manager implemented at least partly in one or more of configurable logic or fixed-functionality logic hardware using circuit technology, one or more deviations of a peripheral device from a common interface based on one or more configuration files; and
   translate, by a driverless hardware abstraction layer implemented at least partly in one or more of configurable logic or fixed-functionality logic hardware using circuit technology, one or more communications between the peripheral device and an application in accordance with the one or more deviations, wherein a product branding adjustment is made in response to the translation of the communications when a drop in a level of quality of a product indicates an impact on taste.

20. The at least one non-transitory computer readable storage medium of claim 19, wherein the instructions, when executed, cause a computing device to one or more of:
   determine, at runtime by a link component implemented at least partly in one or more of configurable logic or fixed-functionality logic hardware using circuit technology, a first deviation of the peripheral device from a common link protocol based on at least one of the one or more configuration files; or
   determine, at runtime by a command component implemented at least partly in one or more of configurable logic or fixed-functionality logic hardware using circuit technology, a second deviation of the peripheral device from a common command set based on at least one of the one or more configuration files.

21. The at least one non-transitory computer readable storage medium of claim 19, wherein the instructions, when executed, cause a computing device to determine, by a quality monitor implemented at least partly in one or more of configurable logic or fixed-functionality logic hardware using circuit technology, based on at least one of the one or more communications, a level of quality of a product dispensed by a system containing the peripheral device, wherein the product branding adjustment is made in response to the translation of the communications when the drop in the level of quality of the product is determined.

22. The at least one non-transitory computer readable storage medium of claim 19, wherein the instructions, when executed, cause a computing device to predict, by a health monitor implemented at least partly in one or more of configurable logic or fixed-functionality logic hardware using circuit technology, based on at least one of the one or more communications, a failure of the system containing the peripheral device.

23. The at least one non-transitory computer readable storage medium of claim 19, wherein the one or more communications are to be translated, by the driverless hardware abstraction layer, between a newly installed peripheral device and the application.

24. The at least one non-transitory computer readable storage medium of claim 19, wherein the one or more communications are to be translated, by the driverless hardware abstraction layer, between one or more of a sensor or an actuator and the application.

25. A universal controller apparatus comprising:
   means for determining, at runtime, one or more deviations of a peripheral device from a common interface based on one or more configuration files; and
   means for translating one or more communications between the peripheral device and an application in accordance with the one or more deviations, wherein a product branding adjustment is made in response to the translation of the communications, wherein the product branding adjustment is made when a drop in a level of quality of a product indicates an impact on taste.

26. The apparatus of claim 25, wherein the means for determining the one or more deviations includes one or more of:
   means for determining, at runtime, a first deviation of the peripheral device from a common link protocol based on at least one of the one or more configuration files; or
   means for determining, at runtime, a second deviation of the peripheral device from a common command set based on at least one of the one or more configuration files.

27. The apparatus of claim 25, further including means for determining, based on at least one of the one or more communications, a level of quality of a product dispensed by a system containing the peripheral device, wherein the product branding adjustment is made in response to the translation of the communications when the drop in the level of quality of the product is determined.

28. The apparatus of claim 25, further including means for predicting, based on at least one of the one or more communications, a failure of the system containing the peripheral device.

29. The apparatus of claim 25, wherein the one or more communications are to be translated between a newly installed peripheral device and the application.

30. The apparatus of claim 25, wherein the one or more communications are to be translated between one or more of a sensor or an actuator and the application.

* * * * *